United States Patent
Tsiatsis et al.

(10) Patent No.: US 10,715,462 B2
(45) Date of Patent: Jul. 14, 2020

(54) FIRST AND SECOND ICN NETWORK NODES AND METHOD THEREIN FOR GENERATING DATA CONTENT

(71) Applicant: Telefonaktiebolaget LM Ericsson (publ), Stockholm (SE)

(72) Inventors: Vlasios Tsiatsis, Solna (SE); Kim Laraqui, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/344,166

(22) PCT Filed: Dec. 21, 2016

(86) PCT No.: PCT/EP2016/082104
§ 371 (c)(1),
(2) Date: Apr. 23, 2019

(87) PCT Pub. No.: WO2018/113943
PCT Pub. Date: Jun. 28, 2018

(65) Prior Publication Data
US 2019/0334835 A1    Oct. 31, 2019

(51) Int. Cl.
*H04L 12/911* (2013.01)
*H04L 12/741* (2013.01)
*H04L 29/08* (2006.01)

(52) U.S. Cl.
CPC .......... *H04L 47/82* (2013.01); *H04L 45/745* (2013.01); *H04L 67/2842* (2013.01)

(58) Field of Classification Search
CPC ... H04L 47/82; H04L 45/745; H04L 67/2842; H04L 67/1097; H04L 67/104;
(Continued)

(56) References Cited

U.S. PATENT DOCUMENTS 8,386,622 B2 *  2/2013  Jacobson .............. H04L 67/104
                                                        709/219
2011/0283185 A1  11/2011  Obasanjo et al.
(Continued)

OTHER PUBLICATIONS

Kim, Yusung, et al., "Differentiated forwarding and caching in named-data networking", Journal of Network and Computer Applications, vol. 60, Jan. 2016, 155-169.

*Primary Examiner* — Todd L Barker
(74) *Attorney, Agent, or Firm* — Murphy, Bilak & Homiller, PLLC

(57) ABSTRACT

A method performed by a first Information Centric Networking (ICN) network node for generating a number of data contents to a number of respective communication devices is provided. The first ICN network node operates in an ICN network 100. The first ICN network node aggregates (501) a number of requests received from a second ICN network node, based on that each request according to a common part of the request is associated with the same theme of the data content being requested by each of the respective communication device. Each aggregated request further comprises a respective customized part associated with the data content. The customized part is requesting the data content to be customized for being consumed in the respective communication device. The first ICN network node locates (502) a set of components corresponding to the requested data content according to the common part, and then generates (503) a number of transformed data contents based on the aggregated requests and the located set of components. Each respective transformed data content fulfils the requested common part and the requested customized part of each respective request and is customized for being consumed in the respective communication device.

20 Claims, 8 Drawing Sheets

(58) Field of Classification Search
CPC .... H04L 67/1065; H04W 4/18; H04W 36/0055; G06F 21/10
See application file for complete search history.

(56) References Cited

U.S. PATENT DOCUMENTS

| | | | |
|---|---|---|---|
| 2013/0039249 A1* | 2/2013 | Ravindran | H04L 67/2842 370/312 |
| 2013/0242996 A1* | 9/2013 | Varvello | H04L 67/327 370/392 |
| 2015/0319241 A1* | 11/2015 | Scott | H04L 67/2842 709/214 |
| 2016/0226782 A1 | 8/2016 | Schneider et al. | |

* cited by examiner

FIRST AND SECOND ICN NETWORK NODES AND METHOD THEREIN FOR GENERATING DATA CONTENT

TECHNICAL FIELD

Embodiments herein relate to a first and a second network nodes and methods therein. In particular, they relate to generating a number of data contents to a respective number of communication devices.

BACKGROUND

Information Centric Networking (ICN) is a new networking paradigm. Content Centric Networking (CCN) is one approach within the ICN paradigm. An example of ICN paradigm, such as the CCN and Named Data Networking (NDN) is described below, nevertheless the ICN paradigm is not limited to that approach.

NDN which is related to CCN, content-based networking, data-oriented networking or ICN, is a new Internet architecture inspired by years of empirical research into network usage and a growing awareness of unsolved problems in contemporary internet architectures like the Internet Protocol (IP). This will have far-reaching implications for how people design, develop, deploy, and use networks and applications.

Instead of focusing on connecting communicating endpoints as traditional networking protocols, such as IP do, ICN focuses on a content object that should be retrieved. In ICN networking messages are routed based on the globally unique names of content objects rather than on endpoint addresses referring to physical or virtual machines.

In CCN a Content Object is retrieved by issuing an Interest message to the network comprising the name of the Content Object. Such a message is routed by the network towards a publisher of the object. CCN nodes along a path towards the source of the object check if they have a cached copy of the object. If so they will respond to the Interest message with a Data message containing the requested Content Object and then the Interest message will not be propagated any further towards a publisher of the object. The routing of the Interest message is helped by the name of the Content Object being a structured name, similar to domain names, but with richer syntax. Routing nodes maintain a Forwarding Information Base (FIB) i.e. the interface or face, about where to forward which name or name prefix. The routing nodes along the path of the Interest message keep a record of the Interest messages they have forwarded such as the face where it came from and what Content Object it was naming, in their Pending Interest Table (PIT). If other Interest messages to the same name of Content Object arrive to the routing node, the routing node does not forward them, just records them in the PIT besides the entry for this name of Content Object; this is called Interest aggregation. In this way the PIT entries for the same name may form a tree in the network with receivers at the leaves. FIG. 1 depicts an overview of an ICN node structure and FIG. 2 depicts an ICN network structure.

FIG. 3 illustrates aspects of CCN/ICN including prefix routing, caching at ICN/CCN nodes (CS), and optimized delivery of cached objects. When an Interest message sent from a communication device A reaches an endpoint B or a routing node C1-C6, i.e. ICN nodes that are routing in this specific scenario, having a copy of the Content Object, maybe cached, the Interest message is responded to with a Data message, which is propagated backwards from C6-C1 along the path the Interest message took until it reaches the communication device A. The backward path C6-C1 is learned from the entries the Interest message left in the PIT of the routers C1-C6 along the path. If there were multiple Interests arriving at a router for this name, the Data message containing the Content Object is replicated towards each respective face and/or direction, where the Interest messages came from. After forwarding a Content Object matching a pending Interest, the routing nodes delete the corresponding entry in the PIT, thus these entries are expected to be short-lived. When the original endpoint(s) generating the Interest message(s) receive the Content Object the transaction is considered closed.

The request aggregation mechanism forms a hierarchical tree in the ICN network where request packets are aggregated and response packets are disaggregated at each level of the tree. This allows ICN networks to scale with increasing number of clients.

One benefit of ICN is in distributing the same information to multiple places in the network. Since routing nodes C1-C6 may cache Content Objects besides forwarding them, Content Objects need not traverse through the entire network every time someone becomes interested in them, a local cached copy suffices. This means that if an Interest message sent from a communication device D via the routing node C7 reaches any of the routing nodes C1-C6, routing node C3 in this example, having a copy of the Content Object, maybe cached, the Interest message is responded to with a Data message. It should be noted that an ICN node is both doing interest routing and a request servicing so the routing nodes C1-C6 are ICN nodes not specific routing nodes.

Another advantage with ICN is the aggregation of Interest messages, in the case of a flash crowd event where suddenly thousands of endpoints are requesting the same content the publisher of the object will only be reached by one request for the content, all other requests will be served from the caches of routing nodes along the path towards the source.

Referring again to FIG. 2, Currently in an ICN system multiple consumers, Consumer 1-N, express their interest in certain pieces of content by sending interest requests to an ICN Entity (ICNE) also known as ICN routers, ICN network nodes or CCN nodes if the CCN approach is followed. The interest requests comprises a content name which may be in form of arbitrary series of bytes that may exhibit a naming structure, content metadata whose structure is currently undefined, eventual Payload and Validation parts.

Producers or sources or publishers on the other hand advertise the content they provide to the ICNE, which pulls the content when it is actually requested by at least one consumer.

The ICNE does a simple interest aggregation such as detecting the same interests based on only the content name with varying types of semantics: a piece of content is the same as another one if it has exactly the same name, strict content name matching, or if the series of bytes are similar with some metric e.g. same subsets of initial bytes, name prefix matching for example. The interests may be received and stored by the ICNE even before the content is actually generated in other words there is not requirement on the existence of the content for the interests to be stored. Along these lines the producer could be hinted based on consumer interests to create the missing content.

Even though this is an efficient networking, there is a need to improve it.

SUMMARY

It is therefore an object of embodiments herein to further improve the performance of an ICN communications network.

According to a first aspect of embodiments herein, the object is achieved by a method performed by a first Information Centric Networking, ICN, network node for generating a number of data contents to a number of respective communication devices. The first ICN network node operates in an ICN network.

The first ICN network node aggregates a number of requests received from a second ICN network node. The number of requests are aggregated based on that each request according to a common part of the request is associated with the same theme of the data content being requested by each respective communication device out of the number of communication devices. Each aggregated request further comprises a respective customized part associated with the data content. The customized part is different in at least some of the number of requests. The customized part is requesting the data content to be customized for being consumed in the respective communication device.

The first ICN network node locates a set of components corresponding to the requested data content according to the common part.

The first ICN network node then generates a number of transformed data contents based on the aggregated number of requests and the located set of components. Each respective transformed data content fulfils the requested common part and the requested customized part of each respective request. Each respective transformed data content is customized for being consumed in the respective communication device.

According to a second aspect of embodiments herein, the object is achieved by a method performed by a second Information Centric Networking, ICN, network node for providing data content to a number of communication devices. The second ICN network node operates in an ICN network.

The second ICN network node collects a number of requests. Each request requesting a data content from each respective communication device out of the number of communication devices. Each request comprises a common part associated with a theme of the data content. Each request further comprises a respective customized part associated with the data content. The customized part is different in at least some of the number of requests. The customized part is requesting the data content to be customized for being consumed in the respective communication device.

The second ICN network node then sends in a message to a first ICN network node operating in the ICN network, information about the common part and the customized part of each of the respective collected request.

The second ICN network node receives an advertising of a number of transformed data contents generated by the first ICN network node. Each respective transformed data content fulfils the requested common part and the requested customized part of each respective request. Each respective transformed data content is customized for being consumed in the respective communication device.

The second ICN network node provides the transformed data contents to the respective communication device according to their respective request.

According to a third aspect of embodiments herein, the object is achieved by a first Information Centric Networking, ICN, network node for generating a number of data contents to a number of respective communication devices. The first ICN network node is operable in an ICN network. The first ICN network node is configured to:

Aggregate a number of requests received from a second ICN network node. The number of requests is to be aggregated based on that each request according to a common part of the request is associated with the same theme of the data content being requested by each respective communication device out of the number of communication devices. Each aggregated request further is adapted to comprise a respective customized part associated with the data content. The customized part is different in at least some of the number of requests. The customized part is requesting the data content to be customized for being consumed in the respective communication device.

Locate a set of components corresponding to the requested data content according to the common part.

Generate a number of transformed data contents based on the aggregated number of requests and the located set of components, where each respective transformed data content fulfils the requested common part and the requested customized part of each respective request. Each respective transformed data content is customized for being consumed in the respective communication device.

According to a fourth aspect of embodiments herein, the object is achieved by a second Information Centric Networking, ICN, network node for providing data content to a number of communication devices. The second ICN network node is operable in an ICN network and is configured to:

Collect a number of requests. Each request requesting a data content from each respective communication device out of the number of communication devices. Each request is adapted to comprise a common part associated with a theme of the data content. Further, each request is adapted to comprise a respective customized part associated with the data content. The customized part is to be different in at least some of the number of requests. The customized part is to request the data content to be customized for being consumed in the respective communication device.

Send in a message to a first ICN network node operating in the ICN network, information about the common part and the customized part of each of the respective collected request.

Receive an advertising of a number of transformed data contents generated by the first ICN network node, where each respective transformed data content is adapted to fulfil the requested common part and the requested customized part of each respective request. Each respective transformed data content is adapted to be customized for being consumed in the respective communication device.

Provide the transformed data contents to the respective communication device according to their respective request.

An advantage with embodiments herein is that they provide on demand, dynamic data content aggregation and generation from constituent content using ICN. A Consumer such as a user of a communication device will find the on demand transformed data content with a customized and personalized content as very valuable.

BRIEF DESCRIPTION OF THE DRAWINGS

Examples of embodiments herein are described in more detail with reference to attached drawings in which.

DETAILED DESCRIPTION

Figure 1:
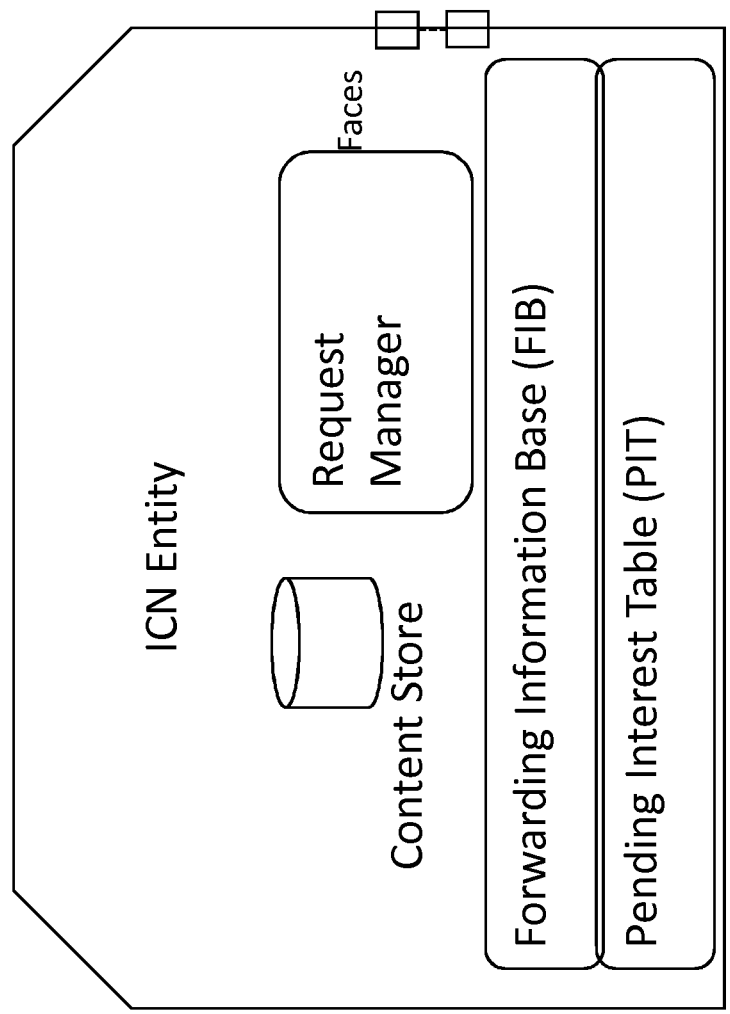
FIG. 1 is a schematic block diagram illustrating prior art.
Figure 2:
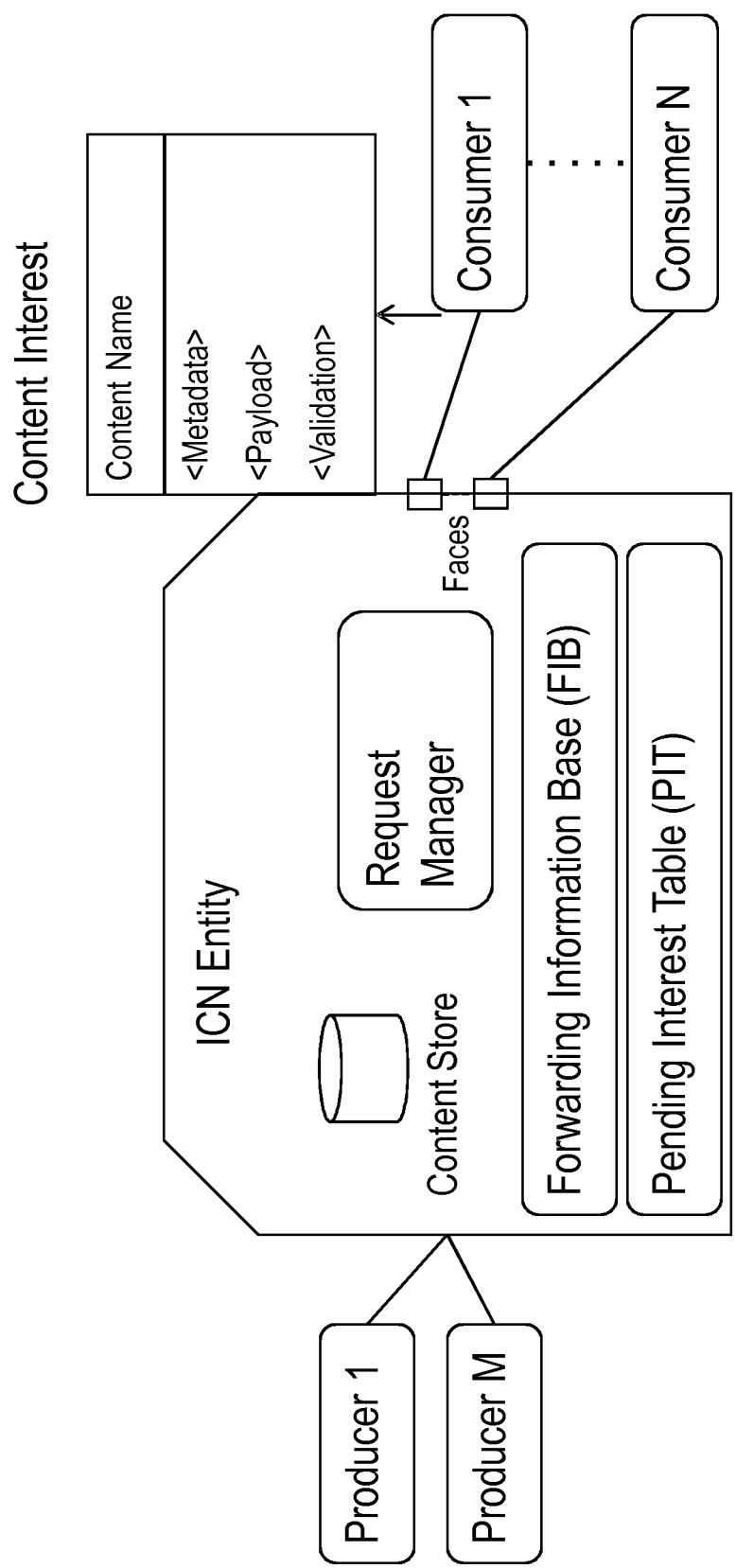
FIG. 2 is a schematic block diagram illustrating prior art.
Figure 3:
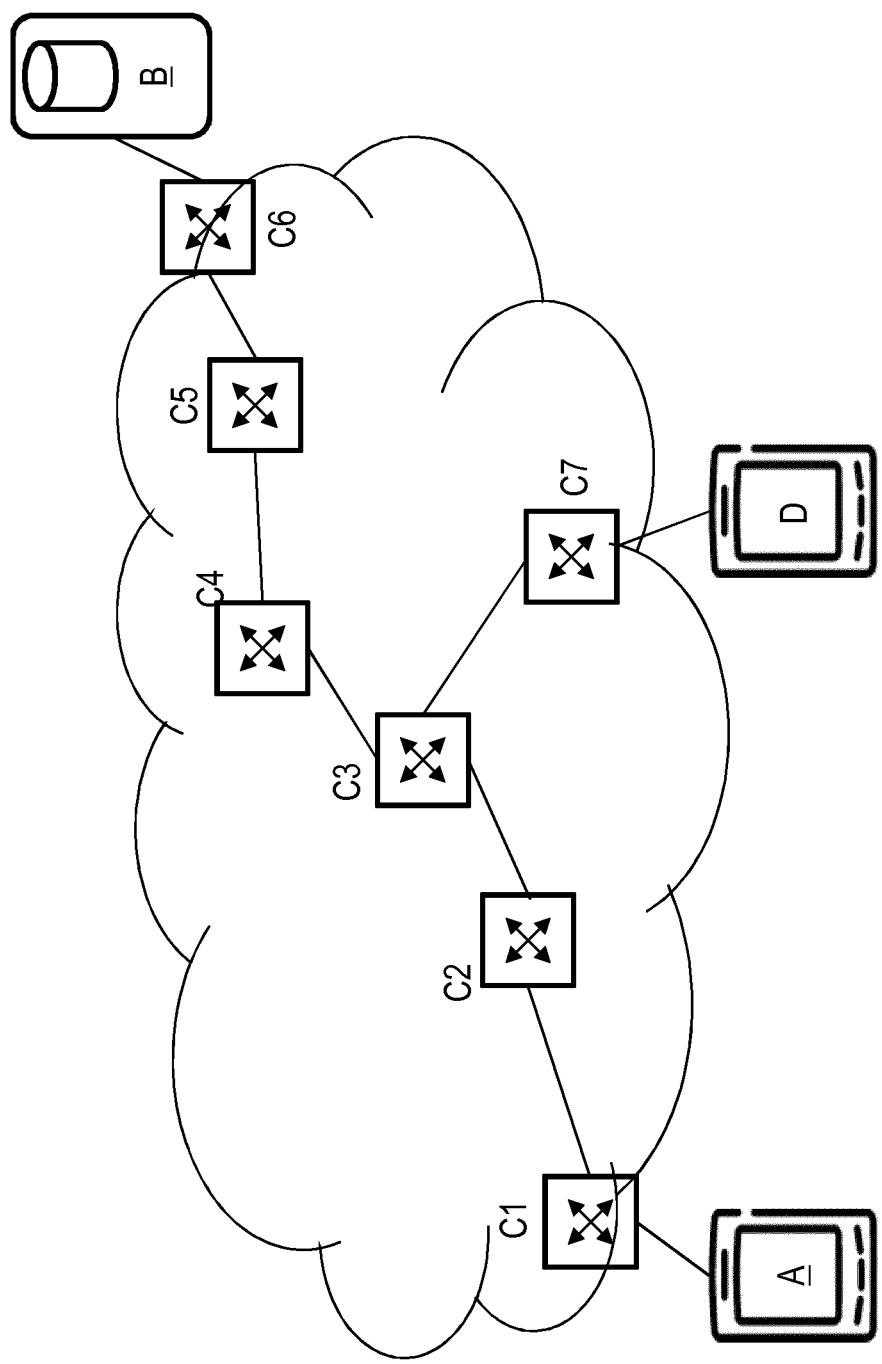
FIG. 3 is a schematic block diagram illustrating prior art.

As part of developing embodiments herein, a problem was first identified and will be discussed below.

As mentioned above, the ICNE does a simple interest aggregation such as detecting the same interests based on only the content name with varying types of semantics: a piece of content is the same as another one if it has exactly the same name, strict content name matching, or if the series of bytes are similar with some metric e.g. same subsets of initial bytes, name prefix matching for example. In conclusion there is no standard way of interest comparison. The interests may be received and stored by the ICNE even before the content is actually generated in other words there is not requirement on the existence of the content for the interests to be stored. Along these lines the producer could be hinted based on consumer interests to create the missing content.

Consumers do not typically have the same types of interests and do not necessarily want to consume, e.g. watch or listen, to the same type of content, e.g. movies or songs.

There is a problem when a large number of consumers referred to herein as communication devices such as e.g. mobile phones requesting customized content to be produced. The producer or producers would need to potentially produce and serve all the consumers with individual custom content, which might be quite similar. For the general case of any content this problem might be unsolvable i.e. a producer cannot produce a custom Star Wars movie with each user preference or a musician cannot produce a song for each consumer.

For the specific cases of movie trailers and song compilations or song re-mixes the customized content generation may be feasible but it is still based on either historical content, e.g. a producer being trained by existing "training" movie trailers and producing a new movie trailer for a specific "test" movie, or based on artist's perception of the viewers/listeners requests such as a DJ producing a song compilation for an event. Moreover in the context of ICN there is no notion of an association between raw and processed content.

Embodiments herein provide a first ICN network node, also referred to as ICN entity which is both a consumer of content and a producer of content at the same time. The Consumer side of the first ICN network node consumes data content from other Producers and the content is combined, transformed and offered from the Producer side of the first ICN network node. The first ICN network node aggregates the interests of the Consumers assisted by a second ICN network node. The first ICN network node searches the constituent content from other Producers, combines content so that the generated content matches the interests of consumers and offers content on demand. In the extreme case the first ICN network node may create one unique piece of content on demand per Consumer but it is preferred that a limited number of different content pieces are generated on demand in order to satisfy most of the Consumers as close as possible. A feedback mechanism from the Consumers to the first ICN network node may also be implemented for the first ICN network node to improve the generated content in the future.

Figure 4:
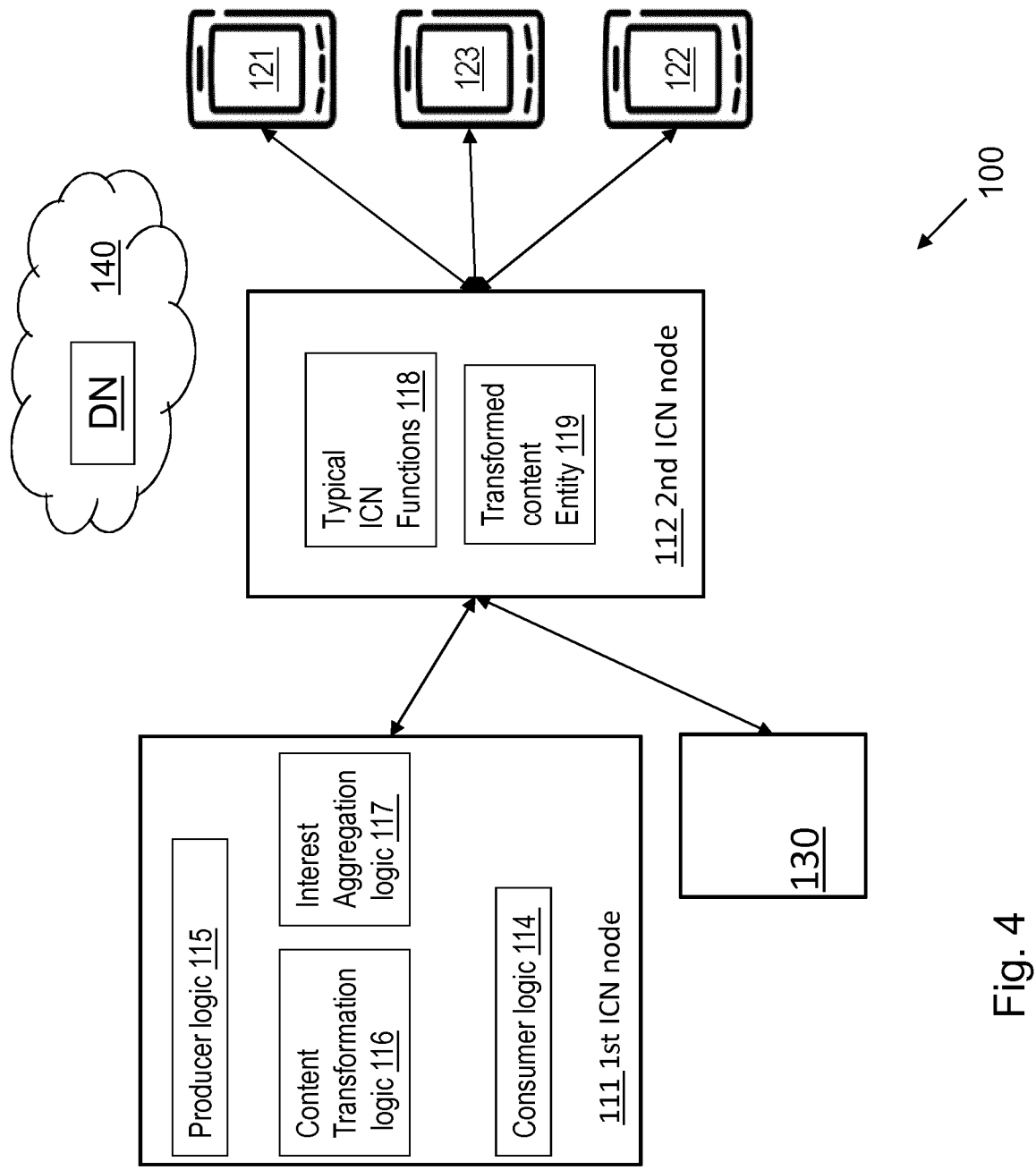
FIG. 4 is a schematic block diagram illustrating embodiments of an ICN network

FIG. 4 depicts an example of an ICN network 100 in which embodiments herein may be implemented. The ICN network may comprise any similar type of network. The ICN network may comprise ICN network nodes, producers and consumers that may be interconnected together.

ICN network nodes operate in the ICN network 100 such as e.g. a first ICN network node 111 and a second ICN network node 112 depicted in FIG. 4.

According to embodiments herein, the first ICN network node 111 comprises a content consumer logic entity 114, a content producer logic entity 115 of the ICN, an entity comprising logic for content transformation 116 such as e.g. transcoding, sampling and compilation, and an entity comprising a logic for interest aggregation 117. According to some embodiments, the first ICN network node 111 produces different "processed" versions of raw content based on some criteria, see examples below. The effect is that the ICN architecture may provide on demand data content transformation and providing such as e.g. distribution via the second ICN network node 112 through ICN procedures. The additional functional components such as data content transformation and interest aggregation will be described below in the context of examples.

The first ICN network node 111 may in some embodiments also comprise typical ICN logic.

The second ICN network node 112 comprises typical ICN logic 118 such as a FIB for storing information about what interface to follow to find a given name of a content object such as a data content, a PIT for storing information about what interests, also referred to as requests herein, that are pending, a request manager and a content store to buffer content objects such as data content for potential reuse. According to some embodiments herein the second ICN network node 112 further comprises an entity 119 for transformed data content or clusters of transformed data content produced by, also referred to as generated by, the first ICN network node 111. The entity 119 for transformed data content may in some embodiments be a part of the content store of the ICNE which is part of the typical ICN logic 118.

The first ICN network node 111 is thus both a producer and consumer while the second ICN network node 112 is more of a routing node. In other words the first ICN network node 111 will in most cases not forward interests further or content further.

In the wireless communication network 100, a number of communication devices operates such as comprising a first communication device 121, a second communication device 122, and a third communication device 123, which are referred to as the communication devices 121, 122, 123 or the number of communication devices 121, 122, 123. It should be understood by the skilled in the art that the term "communication device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or a computer or any other device capable of communicate in a communications network such as an ICN network.

The communication devices 121, 122, 123, may be referred to as consumers. Each of them is interested in, and sends respective requests for customized data content such as e.g. customized videos, and customized music albums from the second ICN network node 112. When the customized data content is received from the second ICN network node 112 in the respective communication devices 121, 122, 123 they consume the customized data content by e.g. playing the video or music on the respective communication device 121, 122, 123. The customized data content is referred to as transformed data content as will be described below.

Further, ICN producer nodes operate in the wireless communication network 100 such as an ICN producer node 130 depicted in FIG. 4. The ICN producer node 130 provides specific data content such as e.g. videos, music album etc. and advertises the availability of the specific data content with names such as e.g. "Star Wars movie episode 3".

Consider that the communication devices 121, 122, 123 are interested in a same video but a different summary of the video, e.g. a movie trailer, each with different characteristics such emphasis on specific actors, or action scenes etc. because the interests of the users of the communication devices 121, 122, 123 are different. The ICN producer node 130 of this movie generates only one high definition video. According to embodiments herein the first ICN network node 111 generates a number of transformed data contents based on requests from the communication devices 121, 122, 123 so as to produce these different versions of the trailer of the video. This is the role of the first ICN network node 111.

The interests such as the requests of the communication devices 121, 122, 123 are sent to the second ICN network node 112 with the content data name having a common part e.g. "Star Wars Episode 3" and a customized part such as a consumer dependent part e.g. "trailer with actor Harrison Ford" or "trailer with fights between people with light sabers". Then the interests from two different consumers, would be in an example scenario be "Star Wars Episode 3/Harrison Ford" from the first communication device 121 and "Star Wars Episode 3/Light saber fights" from the second communication device, 122.

The ICN producer node 130 advertises the availability of the content data with name "Star Wars movie episode 3".

The first ICN network node 111 advertises that it is capable of processing data content also referred to as transforming data contents which may be advertised as "Processed Content Any". Wildcard content name may be used so that the second ICN network node 112 knows that the first ICN network node 111 is capable of processing data content.

According to an example scenario, the second ICN network node 112 collects the requests from the communication devices 121, 122, 123, recognizes e.g. by applying some kind of similarity calculation method, that the communication devices 121, 122, 123, would like to have the data content of the ICN producer node 130 but not in the original form as provided by the ICN producer node 130.

The second ICN network node 112 then informs the first ICN network node 111 about the different interest requests from the communication devices 121, 122, 123 and may in some embodiments instruct the first ICN network node 111 to generate transformed data content according to the customized part.

The first ICN network node 111 performs interest aggregation based on different requests with different common parts of the different requests from a lot of communication devices including the communication devices 121, 122, 123.

Thus the first ICN network node 111 aggregates all requests with a same common part and recognizes all different customized parts among them. In some embodiments, the first ICN network node 111 creates a set of different classes of data content requested to be customized by the communication devices 121, 122, 123. Using the above example, the set would be of size 2 with values "Harrison Ford" and "Light sabers fights". The first ICN network node 111 may also obtain from the second ICN network node 112 the name of the original content "Star Wars episode 3" either separately or as part of the interests forwarded by the second ICN network node 112.

The first ICN network node 111 would then e.g. by using the content consumer logic entity issue an interest such as a request for the data content "Star Wars Episode 3" according to the common part, to the second ICN network node 112. The second ICN network node 112 may in turn obtain the data content from the ICN producer node 130 or the Cache Storage of the second ICN network node 112. The first ICN network node 111 may then invoke the logic for content transformation to transform the raw content to two versions and may use the content producer logic to advertise the two different content versions to the second ICN network node 112.

After this action the communication devices 121, 122, 123 will receive the version they requested from the second ICN network node 112 e.g. cached, or from the first ICN network node 111.

Methods for generating and providing data content to a number of communication devices 121,122,123, is performed by the first ICN network node 111 and the second ICN network node 112. As an alternative, a Distributed Node (DN) and functionality, e.g. comprised in a cloud 140 as shown in FIG. 4, may be used for performing or partly performing the methods.

Figure 5:
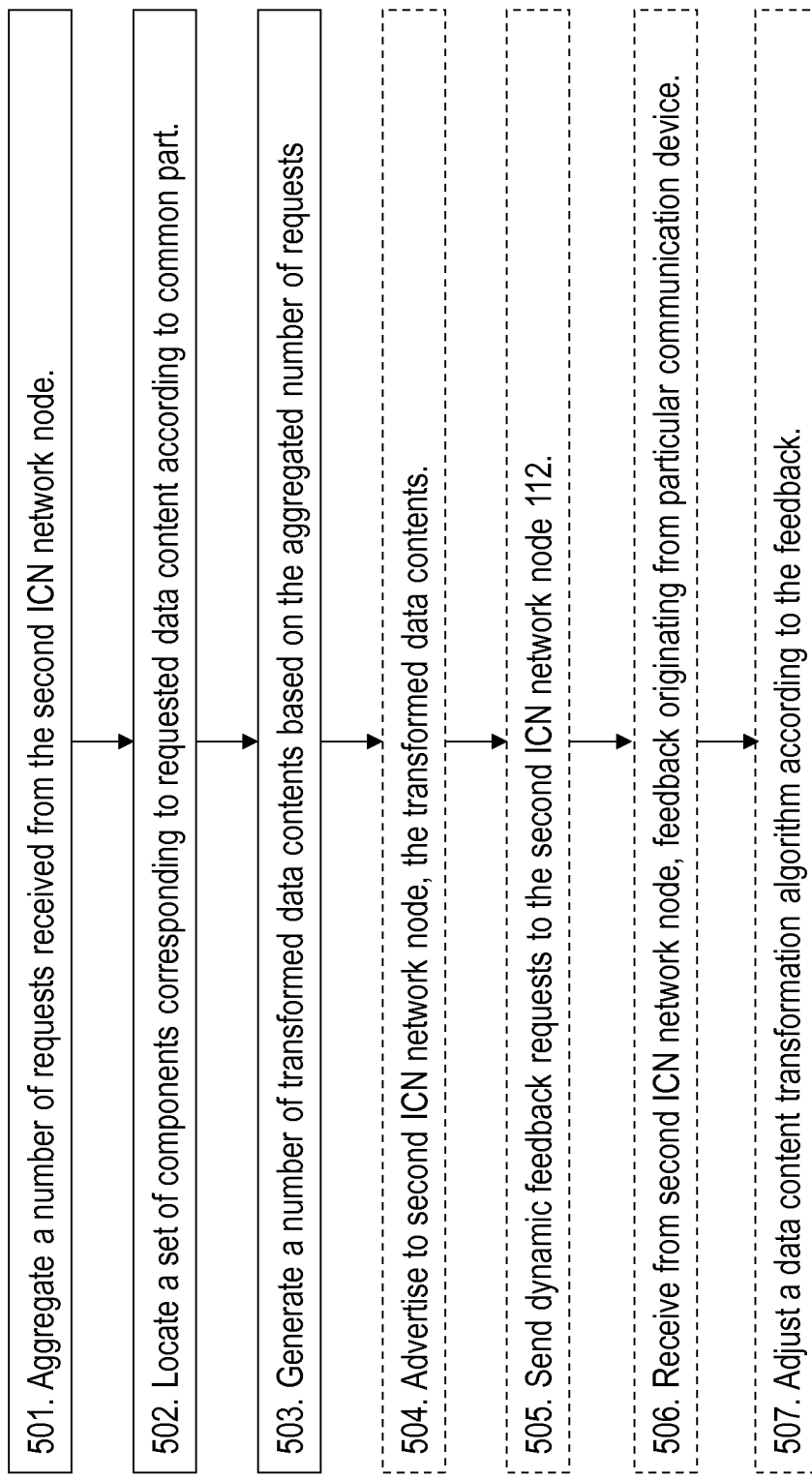
FIG. 5 is a flowchart depicting embodiments of a method in a first ICN network node.

Example embodiments of a method performed by the first ICN network node 111 for generating a number of data contents to a number of respective communication devices 121, 122, 123, will be described in a general way with reference to a flowchart depicted in FIG. 5. After this a more detailed explanation and exemplification follows.

As mentioned above the first ICN network node 111 operates in an ICN network 100.

The method comprises the following actions, which actions may be taken in any suitable order. Actions that are optional are presented in dashed boxes in FIG. 5.

Action 501

The first ICN network node 111 provides transformed data contents by using a set of data content to create a number of different transformed data contents such that they are customized according to different requests from a number of communication devices 121,122,123. A lot of requests from a lot of communication devices are received from the second network node 112. To be able to provide the transformed data content, all the requests need to be sorted such the requests relating to similar themes are aggregated. Then they can be transformed at the same time based on the same data content.

Thus the first ICN network node 111 aggregates a number of requests received from the second ICN network node 112.

The number of requests are aggregated based on that each request according to a common part of the request is associated with the same theme of the data content being requested by each respective communication device out of the number of communication devices 121,122,123.

The theme of the data content may comprise any one or more out of: A name of a data content, a title of a data content, a free text description of the data content, an identifier of the data content, a subset of identifiers of the data content comprised in a compiled data content, a subset of identifiers of data content related to the specific theme, an event description related to the theme where data content is used.

Each aggregated request further comprises a respective customized part associated with the data content. The customized part is different in at least some of the number of requests. The customized part is requesting the data content to be customized for being consumed in the respective communication device 121,122,123. The customized part will be exemplified below.

The first ICN network node 111 may in some embodiments receive an explicit instruction to generate the transformed data contents. Thus in some embodiments, each request further comprises an instruction to generate the transformed data contents according to the customized part of each of the respective collected request.

The data content such as e.g. the movie trailer to be transformed, may be sent from the second ICN network node 112 e.g. together with the number of requests received from the second ICN network node 112. The instruction to generate transformed data contents according to the customized part of each of the respective collected request may be based on an enclosed data content according to the common part.

In other embodiments the instruction may be implicit by the second ICN network node 112 sending the common part and the customized part to the first ICN node 111. Moreover this instruction may include a timestamp in the future with the interpretation that the first ICN node should begin the new data content generation at the specified time instant.

Action 502

To be able to transform the data content the first ICN network node 111 needs the original data content. The first ICN network node 111 locates a set of components corresponding to the requested data content according to the common part. The data content such as e.g. the movie trailer to be transformed, may be sent from the second ICN network node 112 e.g. together with the number of requests received from the second ICN network node 112. Alternative ways to locate a set of components corresponding to the requested data content may be for the first ICN network node 111 to use the Consumer logic and request the needed components from the ICN network 100 separately as if it was just a consumer.

Action 503

The first ICN network node 111 generates a number of transformed data contents based on the aggregated number of requests, aggregated in Action 501, and the located set of components located in Action 502. This is performed such that each respective transformed data content fulfils the requested common part and the requested customized part of each respective request, and each respective transformed data content is customized for being consumed in the respective communication device 121,122,123.

This may be performed for example by a deep learning system trained to produce movie trailers such as Watson of IBM, however being seed with the customized part of the request. Currently Watson produces trailers by watching the original movies and their trailers produced by professionals, thereby extracting the professional knowledge. Therefore the current state of the art of trailer generation does not use any configuration for the trailer generation while embodiments herein provide the use of extra configuration parameters comprising the customized part of the request. In the case of music compilations the content generation may be performed by taking into account the theme, e.g. "birthday party of a child" and other parameters such as the country of origin of the request, the typical birthday party duration etc. The content collection performed by e.g. the Consumer logic of the first ICN node 111 would collect the appropriate songs for the child's age and language e.g. based on the country of origin, and put together the songs one after the other to match the party duration. The transitions between songs may be simple, e.g. lowering the volume of the current song while increasing the volume on the next one. The tempo of the different songs may also follow a pattern found in most similar events in the specific country. This pattern may be built up the first ICN network node 111 based on the feedback provided by the consumer of the content or retrieved as a customized part of the request. A tempo pattern may be described for example as "start with high tempo songs and gradually slow down" in order to address the fact that children may get tired as the party is in progress.

Action 504

The first ICN network node 111 performs the generation of the transformed data contents on demand from the second ICN network node, while the second ICN network node 112 is the node that handles the contact with the number of communication devices 121,122,123. The second network node will thus handle the providing, e.g. distribution, of the transformed data contents to the different communication devices 121,122,123. Therefore, in some embodiments the first ICN network node 111 advertises to the second ICN network node 112, the number of transformed data contents. This may be performed by the first ICN network node 111 sending to the second ICN network node 112, the descriptions of the generated data content with the common part and the customized parts. For example if the first ICN network node 111 generates two trailers for the movie Star Wars episode 3, one trailer with most scenes showing a specific requested actor with Actor Name and another trailer with most scenes having fighting with light sabers, the first ICN network node 111 sends to the second ICN network node 112 two advertisements: a) the first ICN network node 111 is provider of "Star Wars Episode 3, Actor Name", b) the first ICN network node 111 is provider of "Star Wars Episode 3, fights with light sabers". The advertisements should be formatted according to the ICN protocols.

Action 505

To improve the generation of transformed data contents the first ICN network node 111 wishes to follow up the experience of the communication devices 121,122,123 when they consumed the transformed data content. Were the expectations according to their requests satisfied? To get a useful feedback the request for the feedback is preferably dynamic. This is such that each feedback request is individual for the respective communication devices 121,122, 123 relating to their individual request and requesting feedback reflecting the respective associated transformed data content when consumed. Therefore, in some embodiments the first ICN network node 111 sends a dynamic feedback request to the second ICN network node 112. The dynamic feedback request requests feedback from a particular communication device 121 out of the number of communication devices 121,122,123. The dynamic feedback request relates to the transformed data content when consumed in the particular communication device 121.

Action 506

The first ICN network node 111 may receive feedback from the second ICN network node 112. The feedback originates from a particular communication device 121 out of the number of communication devices 121,122,123. The feedback relates to the transformed data content consumed in the particular communication device 121.

The feedback may be received without the first ICN network node 111 sending any request for feedback, but in the embodiments, the feedback received from the second ICN network node 112, relates to the dynamic feedback request sent in action 505.

Action 507

The first ICN network node 111 may then adjust a data content transformation algorithm according to the feedback. The algorithm for generation of transformed data content is typically an optimization procedure with some constraints. Some example constraints are the Number of new Pieces of content to be generated (NP), and the customized parts of the requests from the different consumers. If the Number of different Consumers is NC and NC is much larger than NP, the optimization algorithm will result in NP different generated pieces of content that minimize the distance between the customized parts such as features, and the features that these NP pieces will have but this distance will never be zero. This distance is sometimes called "error". For example if two users of communication devices 121,122, request a movie trailer of the move Star Wars episode 3, common part, and "Harrison Ford" as the customized part of the first request and the "Light saber fights" for the custom part of the other request and the content generation optimization algorithm can only generate one movie trailer, there may not be enough movie scenes with "Harrison Ford" and "light saber fights" in the movie. As a result the two requesters will be dissatisfied. The objective of the optimization algorithm is to make them as little dissatisfied as possible. If the feedback from one of the communication devices 111 is harsh that e.g. the actor "Harrison Ford" is not in many trailer scenes then the content generation algorithm may generate new content or edit the already existing one with adding more "Harrison Ford" scenes. This is one such example embodiment; another is to adjust the optimization to generate more pieces than NP when the "error" is above a certain threshold which will probably result in bad feedback from the consumer devices.

Figure 6:
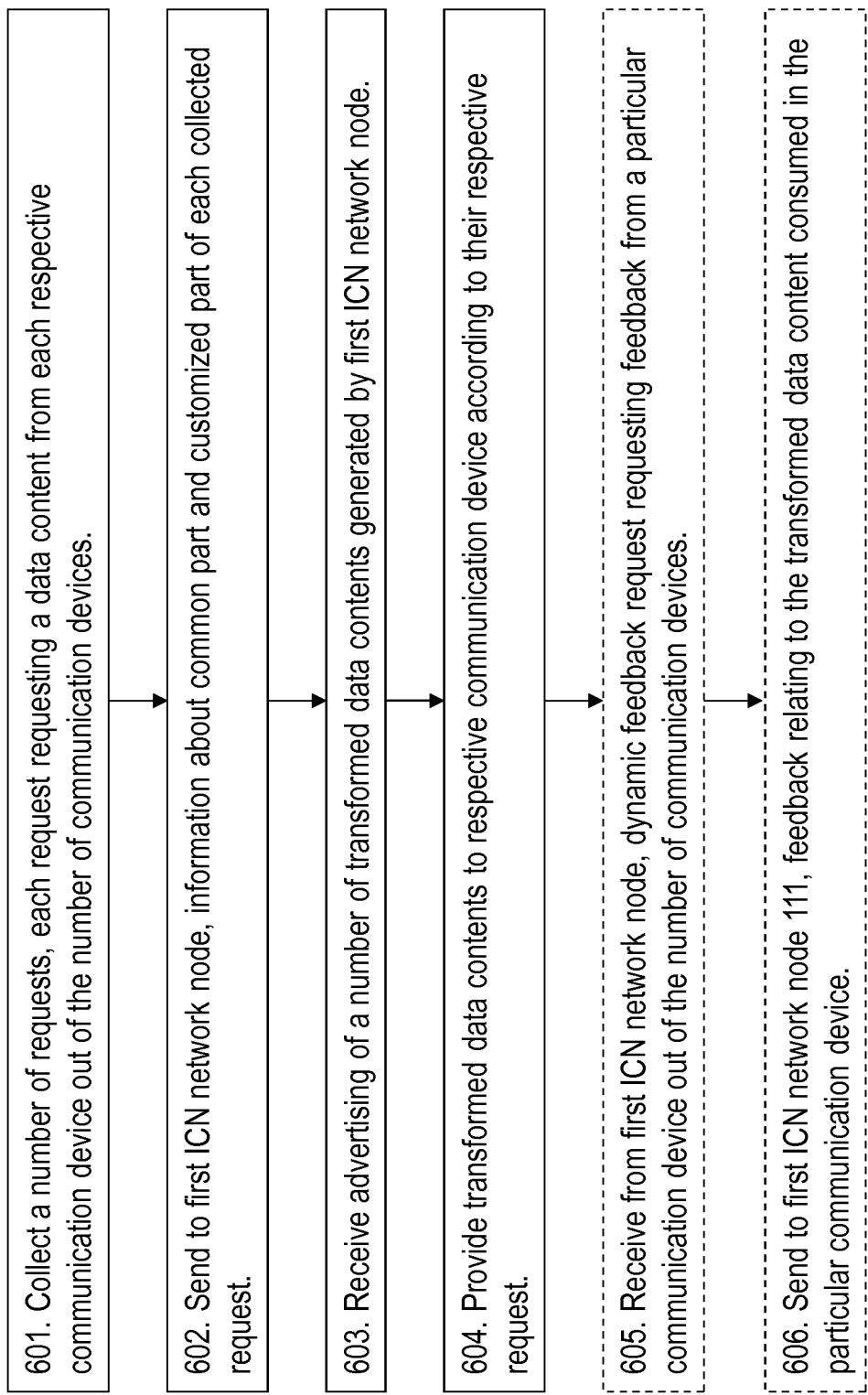
FIG. 6 is a flowchart depicting embodiments of a method in a second ICN network node.

Example embodiments of a method performed by the second ICN network node 112 for providing data content to the number of communication devices 121,122,123 will be described in a general way with reference to a flowchart depicted in FIG. 6. After this the more detailed explanation and exemplification follows.

As mentioned above the second ICN network node 112 operates in the ICN network 100.

The method comprises the following actions, which actions may be taken in any suitable order. Actions that are optional are presented in dashed boxes in FIG. 6.

Action 601

As mentioned above, the first ICN network node 111 performs the generation of the transformed data contents on demand from the second ICN network node 112, while the second ICN network node 112 is the node that handles the contact with the number of communication devices 121,122, 123. The second network node 112 will thus handle the incoming requests from the number of communication devices 121,122,123 and keep track of them and forward them to the first ICN network node 111.

This means that the second ICN network node 112 collects a number of requests. Each request requesting a data content from each respective communication device out of the number of communication devices 121,122,123. Each request comprises a common part associated with a theme of the data content, and each request further comprises a respective customized part associated with the data content. The customized part is different in at least some of the number of requests. The customized part is requesting the data content to be customized for being consumed in the respective communication device 121,122,123.

The theme of the data content may e.g. comprise any one or more out of: A name of a data content, a title of a data content, a free text description of the data content, an identifier of the data content, a subset of identifiers of the data content comprised in a compiled data content, and a subset of identifiers of data content related to a specific theme.

Action 602

The second ICN network node 112 sends in a message to the first ICN network node 111 operating in the ICN network 100, information about the common part and the customized part of each of the respective collected request. It should be noted that the information may be sent in one or more messages.

The message sent to the first ICN network node 111 may further comprise an instruction to generate transformed media files according to the customized part of each of the respective collected request.

The instruction to generate transformed data contents may further state that it shall be based on an enclosed data content according to the common part.

Action 603

The second network node 112 will further handle the providing such as e.g. distribution of the transformed data contents to the different communication devices 121,122, 123. The second ICN network node 112 receives an advertising of a number of transformed data contents generated by the first ICN network node 111. Each respective transformed data content fulfils the requested common part and the requested customized part of each respective request, and each respective transformed data content is customized for being consumed in the respective communication device 121,122,123.

Action 604

As mentioned above the second network node 112 handled the incoming requests from the number of communication devices 121,122,123 and kept track of them. The second network node 112 now obtains the transformed data contents and matches the transformed data contents with the respective communication devices out of the number of communication devices 121,122,123 and its associated request. The second ICN network node 112 then provides the transformed data contents to the respective communication device 121,122,123 according to their respective request. This may e.g. be performed by the first ICN network node 111 pushing the pieces of content to the Content Store of the second ICN network node 112 and annotating the pieces of content a list of attributes. The list of attributes may comprise the common part of the request by the requesting communication devices 121,122,123 and some other attributes relating to the customized parts of the different requests from the communication devices 121,122,123. Since the number of generated pieces of content, NP, that is the transformed data contents may be much smaller that the different requests NC, which may have different customized parts, the interest aggregation algorithm performs a clustering of these customized parts into NP clusters of attributes, each cluster corresponding to each piece of generated content. As a result each of the NP generated pieces of content is annotated with the common request part and corresponding cluster of attributes.

Action 605

To improve the generation of transformed data contents the first ICN network node 111 wishes to follow up the experience of the communication devices 121,122,123 when they consumed the transformed data content. This is mentioned above. Therefore, in some embodiments, the second ICN network node 112 receives from the first ICN network node 111, a dynamic feedback request, requesting feedback from a particular communication device 121 out of the number of communication devices 121,122,123. The dynamic feedback request relates to the transformed data content when consumed in the particular communication device 121.

Action 606

The second ICN network node 112 may send to the first ICN network node 111, feedback originating from a particular communication device 121 out of the number of communication devices 121,122,123. The feedback relates to the transformed data content consumed in the particular communication device 121.

The feedback sent to the first ICN network node 111 may according to some embodiments relate to the dynamic feedback request.

Embodiment's herein will now be further described and explained. The examples described below are applicable to and may be combined with any suitable embodiment described above. FIG. 4 described above, shows a system setup for embodiments herein. The first ICN network node 111 is referred to as "1st ICN node" and the second ICN network node 112 is referred to as "2nd ICN node" in FIG. 4.

Embodiments herein enable generation of personalized content, referred to herein as the transformed data content. The wordings "personalized content" and "transformed data content" may be used interchangeable. The personalized content will be defined in the customized part of the request.

According to an example scenario, the common part to be sent in the request relates to the theme being a trailer of a specific movie. An example of a personalized content is a trailer of a new movie based on user preferences as opposed to professional trailer producers. According to the example scenario, a user of the first communication device 121 would prefer to watch a trailer with a specific actor or sets of actors in most scenes or a specific actor in an action scene or only action scenes. These are examples of user preferences also referred to the customized part to be sent in the request. How the movie trailer is generated, how transitions of the different selected parts of the movie are generated, this is out of the scope of embodiments herein. Currently movie trailers are produced but based on different criteria, i.e. experience of professional trailer producers. However, example embodiments herein provide automatic trailer production based on user preferences.

According to other example scenarios, the common part to be sent in the request relates to the theme being a new release of an album by an artist, an artist name, a specific genre, or type e.g. dance songs. In these example scenarios the personalized content to be defined in the customized part to be sent in the request is a compilation of a subset of songs from the new release of the album by the artist, a compilation of songs from different artists based on the genre preferences, or a specific re-mix of different dance songs with specific dance transition preferences such as e.g. lively such as high tempo music in the beginning, slow such as low tempo music towards the end.

The personalized content requested in the customized part may be further described by using sub-definitions e.g. by using different attributes in the request messages from the number of communication devices 121,122,123 to the second CSN network node 112. The different attributes may according to the example scenario wherein the theme is a trailer of a specific movie, indicate the specific actor or actors, specific types of scenes that a user of e.g. the communication device 121 would like to have in a the trailer. These attributes may be comprised in the customized part of the request message which request message further e.g. comprises the common part, Star Wars episode 3. The second ICN network node 112 detects also these sub-definitions of the customized part of the request also referred to as the extensions to the content metadata in the interest messages and similarly as described above, sends all the interests to the first ICN network node 111 as is.

According to an example embodiment of the method performed in the first ICN network node 111, the first ICN network node 111 performs the following actions:

The first ICN network node 111 receives the requests from the second ICN network node 112 and performs interest clustering based on the attributes in the metadata section of all the interests e.g. by means of the interest aggregation logic 117. This means that the first ICN network node 111 aggregates requests from the number of communication devices 121,122,123 which requests have the same common part. So there may be one cluster related to one common part of interest or multiple clusters with different common part of interests. There may also be multiple clusters having a common part and different custom parts. The first ICN network node 111 may optimize the clustering by imposing a limit on the number of requests in a cluster e.g. K, or a limit on the number of possible customized movie trailers, i.e. transformed data contents, to NP. For example it may be chosen e.g. to receive maximum (K=)100 requests having the same common part and cluster them into (NP=)10 clusters having different custom parts. This relates to Action 501 described above.

To be able to transform the data content the first ICN network node 111 needs the original movie. The first ICN network node 111 locates a set of components corresponding to requested data content according to common part. These data content may be obtained by the use of ICN protocols but the Consumer Logic of the first ICN network node 111. Therefore the first ICN network node 111 plays the role of a normal consumer of the original movie trailer and the request enters the ICN network until it is satisfied by an intermediate node or the original movie producer. Thus the first ICN network node 111 locates and obtains the original movie trailer, e.g. by means of the consumer logic 114 and using ICN or by receiving it from the second ICN node 112. This relates to Action 502 described above.

The first ICN network node 111 may then instruct the content transformation function in the content transformation logic 116 to create the NP different movie trailers, i.e. the transformed data contents. This relates to Action 503 described above.

The first ICN network node 111 may then advertise their availability on the ICN entity e.g. by means of Producer logic 115. This may be performed by sending the transformed data contents to the second ICN network node 112 who advertises the transformed data contents. This relates to Action 504 described above.

The first ICN network node 111 may in some embodiments subscribe to the second ICN network node 112 about feedback from the Consumers, i.e. the number of communication devices 121,122,123. This feedback is dynamic content requested by the first ICN network node 111 from the relevant Consumers i.e. the number of communication devices 121,122,123. When a communication device 121, 122,123 generates feedback, this feedback is sent to the second ICN network node 112 which forwards it to the first ICN network node 111. The feedback may be represented by a custom form for each respective communication device 121,122,123 to be filled in by a user i.e. of each communication device 121,122,123, consuming the respective transformed data content. The custom form addresses the interests according to each request from each communication device 121,122,123 and e.g. asks the user to rate the relevance of the generated content according the common and customized part of the request. For example the form may ask a multiple choice question such as "Did you enjoy your favorite actor Alice Somebody in the content you requested . . . ? Rate your response with a score from 1 to 5." This relates to Action 505 and 506 described above.

The first ICN network node 111 has the possibility to adjust the content generation algorithm according to the feedback. This relates to Action 507 described above.

According to an example embodiment of the method performed in the second ICN network node 112, the second ICN network node 112 performs the following actions:

The second ICN network node 112 being part of the current transaction, obtains from the first ICN network node 111, the transformed data contents according to the respective request from the communication devices 121,122,123, such as new interests or clusters of interests i.e. transformed data contents, generated by the first ICN network node 111. The second ICN network node 112 may then enter the transformed data contents with pointers to the relevant consumers into a PIT of the typical ICN functions 118 of the second ICN network node 112. Then the second ICN network node 112 may pull the advertisements which include the clusters of attributes from the first ICN network node 111 as if it was regular data content. This relates to Action 603 described above.

The second ICN network node 112 then forwards the trailers to the corresponding consumers, i.e. to the respective communication devices 121,122,123. This relates to Action 604 described above.

Figure 7:
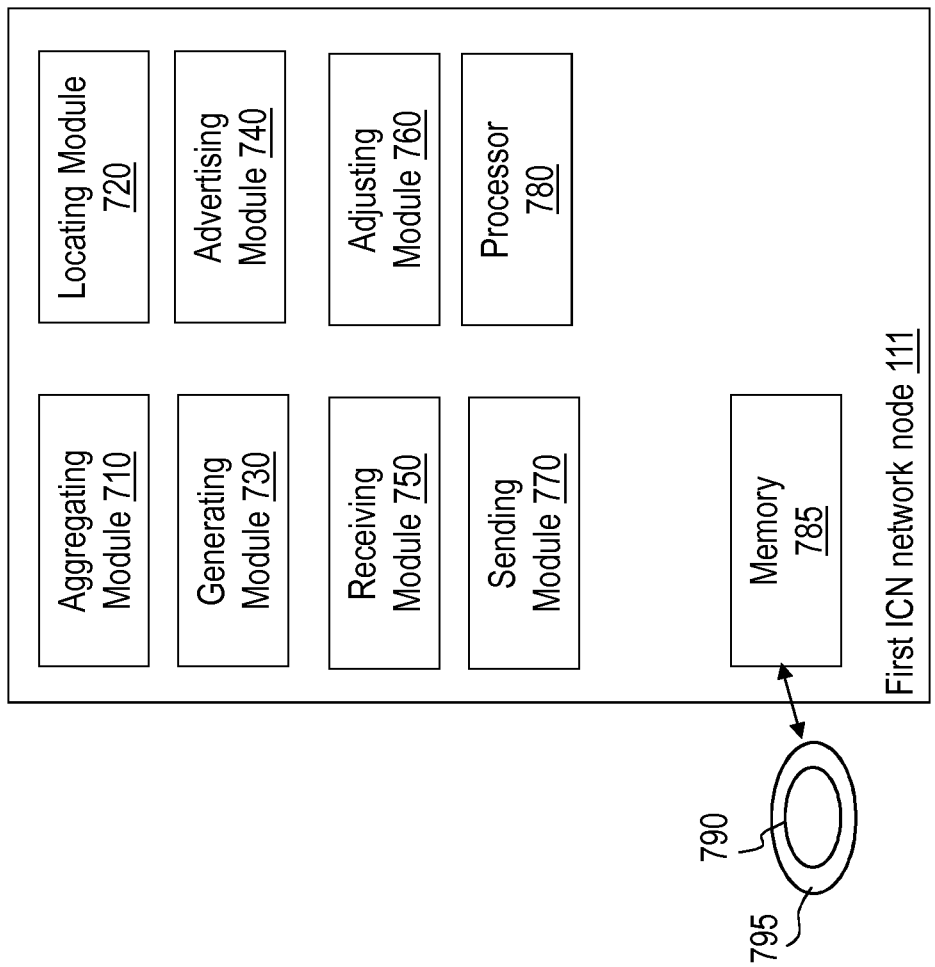
FIG. 7 is a schematic block diagram illustrating embodiments of a first ICN network node.

To perform the method actions for generating a number of data contents to a number of respective communication devices 121, 122, 123, the first ICN network node 111 may comprise the following arrangement depicted in FIG. 7. As mentioned above, the first ICN network node 111 is operable in an ICN network 100.

The first ICN network node 111 is configured to, e.g. by means of an aggregating module 710 configured to, aggregate a number of requests received from a second ICN network node 112. The number of requests is to be aggregated based on that each request according to a common part of the request is associated with the same theme of the data content being requested by each respective communication device out of the number of communication devices 121, 122,123.

Each aggregated request is further adapted to comprise a respective customized part associated with the data content. The customized part is different in at least some of the number of requests. The customized part is requesting the data content to be customized for being consumed in the respective communication device 121,122,123.

In some embodiments, each request further is adapted to comprise an instruction to generate the transformed data contents according to the customized part of each of the respective collected request. In these embodiments, the instruction to generate transformed data contents according to the customized part of each of the respective collected request may be based on an enclosed data content according to the common part. The theme of the data content may be adapted to comprise any one or more out of: A name of a data content, a title of a data content, a free text description of the data content, an identifier of the data content, a subset of identifiers of the data content comprised in a compiled data content, and a subset of identifiers of data content related to a specific theme.

The aggregating module 710 may be implemented by or arranged in communication with a processor 780 of the first ICN network node 111.

The first ICN network node 111 is configured to locate, e.g. by means of a locating module 720 configured to locate, a set of components corresponding to the requested data content according to the common part.

The locating module 720 may be implemented by or arranged in communication with the processor 780 of the first ICN network node 111.

The first ICN network node 111 is configured to generate, e.g. by means of a generating module 730 configured to generate, a number of transformed data contents based on the aggregated number of requests and the located set of components, where each respective transformed data content fulfils the requested common part and the requested customized part of each respective request, and wherein each respective transformed data content is customized for being consumed in the respective communication device 121,122,123.

The generating module 730 may be implemented by or arranged in communication with the processor 780 of the first ICN network node 111.

The first ICN network node 111 is configured to advertise, e.g. by means of an advertising module 740 configured to advertise to the second ICN network node 112, the number of transformed data contents.

The advertising module 740 may be implemented by or arranged in communication with the processor 780 of the first ICN network node 111.

The first ICN network node 111 is configured to receive, e.g. by means of a receiving module 750 configured to receive from the second ICN network node 112, feedback originating from a particular communication device 121 out of the number of communication devices 121,122,123, which feedback is adapted to be related to the transformed data content consumed in the particular communication device 121.

The receiving module 750 may be implemented by or arranged in communication with the processor 780 of the first ICN network node 111.

The first ICN network node 111 is configured to adjust, e.g. by means of an adjusting module 760 configured to adjust a data content transformation algorithm according to the feedback.

The adjusting module 760 may be implemented by or arranged in communication with the processor 780 of the first ICN network node 111.

In some embodiments, the first ICN network node 111 is configured to send, e.g. by means of a sending module 770 configured to send to the second ICN network node 112, a dynamic feedback request requesting feedback from a particular communication device 121 out of the number of communication devices 121,122,123. The dynamic feedback request is adapted to be related to the transformed data content when consumed in the particular communication device 121. In these embodiments, the feedback received from the second ICN network node 112, may be adapted to relate to the dynamic feedback request.

The sending module 770 may be implemented by or arranged in communication with the processor 780 of the first ICN network node 111.

The embodiments herein for generating a number of data contents to a number of respective communication devices 121, 122, 123 may be implemented through one or more processors, such as the processor 780 of a processing circuitry in the first ICN network node 111 depicted in FIG. 7, together with computer program code for performing the functions and actions of the embodiments herein. The program code mentioned above may also be provided as a computer program product, for instance in the form of a data carrier carrying computer program code for performing the embodiments herein when being loaded into the first ICN network node 111. One such carrier may be in the form of a CD ROM disc. It is however feasible with other data carriers such as a memory stick. The computer program code may furthermore be provided as pure program code on a server and downloaded to the first ICN network node 111.

The first ICN network node 111 may further comprise a memory 785 comprising one or more memory units. The memory 785 comprises instructions executable by the processor 780.

The memory 785 is arranged to be used to store e.g. information about requests, data, configurations, feedback, data content, transformed data content, and applications to perform the methods herein when being executed in the first ICN network node 111.

In some embodiments, a computer program 790 comprises instructions, which when executed by the at least one processor 780, cause the at least one processor 780 to perform actions according to any of the Actions 501-507.

In some embodiments, a carrier 795 comprises the computer program 790, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the first ICN network node 111 described above may refer to a combination of analog and digital circuits, and/or one or more processors configured with software and/or firmware, e.g. stored in the memory 785, that when executed by the one or more processors such as the processor 780 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 8:
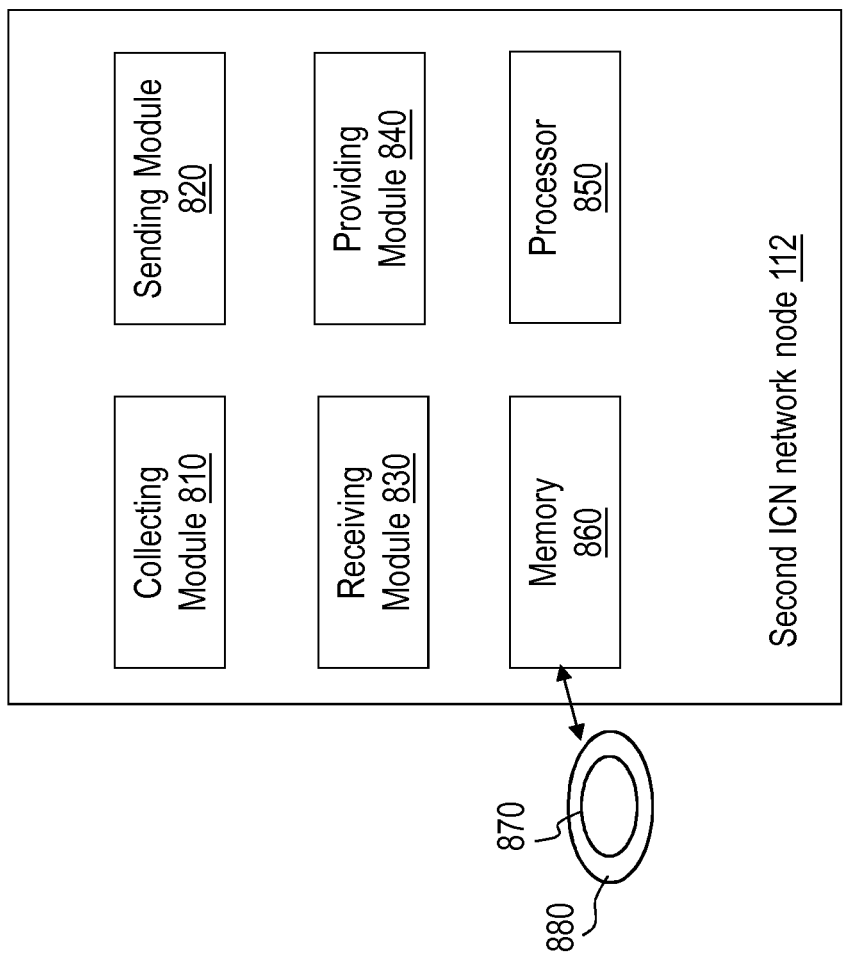
FIG. 8 is a schematic block diagram illustrating embodiments of a second ICN network node.

To perform the method actions for providing data content to a number of communication devices 121,122,123, the second ICN network node 112 may comprise the following arrangement depicted in FIG. 8. As mentioned above, the second ICN network node 112 is operable in an ICN network 100.

The second ICN network node 112 is configured to collect, e.g. by means of a collecting module 810 configured to collect a number of requests. Each request requesting a data content from each respective communication device out of the number of communication devices 121,122,123. Each request is adapted to comprise a common part associated with a theme of the data content, and each request further is adapted to comprise a respective customized part associated with the data content. The customized part is to be different in at least some of the number of requests. The customized part is to request the data content to be customized for being consumed in the respective communication device 121,122, 123.

The theme of the data content may be adapted to comprise any one or more out of: a name of a data content, a title of a data content, a free text description of the data content, an identifier of the data content, a subset of identifiers of the data content comprised in a compiled data content, and a subset of identifiers of data content related to a specific theme.

The collecting module 810 may be implemented by or arranged in communication with a processor 850 of the second ICN network node 112.

The second ICN network node 112 is further configured to send, e.g. by means of a sending module 820 configured to send in a message to the first ICN network node 111 operating in the ICN network 100, information about the common part and the customized part of each of the respective collected request.

In some embodiments, the message sent to the first ICN network node 111 further is adapted to comprise an instruction to generate transformed media files according to the customized part of each of the respective collected request. In these embodiments, the instruction to generate transformed data contents may further be adapted to state that it shall be based on an enclosed data content according to the common part.

The second ICN network node 112 may further be configured to send, e.g. by means of the sending module 820 configured to send to the first ICN network node 111, feedback originating from a particular communication device 121 out of the number of communication devices 121,122,123, which feedback is adapted to relate to the transformed data content consumed in the particular communication device 121.

The sending module 820 may be implemented by or arranged in communication with the processor 850 of the second ICN network node 112.

The second ICN network node 112 is further configured to receive, e.g. by means of a receiving module 830 configured to receive an advertising of a number of transformed data contents generated by the first ICN network node 111. Each respective transformed data content is adapted to fulfil the requested common part and the requested customized part of each respective request. Each respective transformed data content is adapted to be customized for being consumed in the respective communication device 121,122,123.

In some embodiments, the second ICN network node 112 is further configured to receive, e.g. by means of the receiving module 830 configured to receive from the first ICN network node 111, a dynamic feedback request requesting feedback from a particular communication device 121 out of the number of communication devices 121,122,123. The dynamic feedback request is adapted to relate to the transformed data content when consumed in the particular communication device 121. In some of these embodiments, the feedback sent to the first ICN network node 111, is adapted to relate to the dynamic feedback request.

The receiving module 830 may be implemented by or arranged in communication with the processor 850 of the second ICN network node 112.

The second ICN network node 112 is further configured to provide, e.g. by means of a providing module 840 configured to provide the transformed data contents to the respective communication device 121,122,123 according to their respective request.

The providing module 840 may be implemented by or arranged in communication with the processor 850 of the second ICN network node 112.

The embodiments herein for providing data content to a number of communication devices 121,122,123 may be implemented through one or more processors, such as the processor 850 of a processing circuitry in the second ICN network node 112 depicted in FIG. 8, together with computer program code for performing the functions and actions of the embodiments herein. The program code mentioned above may also be provided as a computer program product, for instance in the form of a data carrier carrying computer program code for performing the embodiments herein when being loaded into the second ICN network node 112. One such carrier may be in the form of a CD ROM disc. It is however feasible with other data carriers such as a memory stick. The computer program code may furthermore be provided as pure program code on a server and downloaded to the second ICN network node 112.

The second ICN network node 112 may further comprise a memory 860 comprising one or more memory units. The memory 860 comprises instructions executable by the processor 850.

The memory 860 is arranged to be used to store e.g. information about requests, data content, configurations, feedback, data content, transformed data content, and applications to perform the methods herein when being executed in the second ICN network node 112.

In some embodiments, a computer program 870 comprises instructions, which when executed by the at least one processor 850, cause the at least one processor 850 to perform actions according to any of the Actions 601-606.

In some embodiments, a carrier 880 comprises the computer program 870, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the modules in the second ICN network node 112, described above may refer to a combination of analog and digital circuits, and/or one or more processors configured with software and/or firmware, e.g. stored in the memory 860, that when executed by the one or more processors such as the processor 850 as described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

ABBREVIATIONS

CCN Content Centric Networking
CS Content Store (ICN related)
FIB Forwarding Information Base (ICN related)
ICN Information Centric Networking
ICNE ICN Entity
LTE Long Term Evolution, also known as 4G
PIT Pending Interest Table (ICN related)
UE User Equipment

The invention claimed is:

1. A method performed by a first Information Centric Networking (ICN) network node for generating a number of data contents to a number of respective communication devices, wherein the first ICN network node operates in an ICN network, the method comprising:
   aggregating a number of requests received from a second ICN network node, wherein the number of requests are aggregated based on each request, according to a common part of the request, being associated with the same theme of the data content being requested by each respective communication device out of the number of communication devices,
   and wherein each aggregated request further comprises a respective customized part associated with the data content, wherein the customized part is different in at least some of the number of requests, and wherein the customized part is requesting the data content to be customized for being consumed in the respective communication device;
   locating a set of components corresponding to the requested data content according to the common part; and
   generating a number of transformed data contents based on the aggregated number of requests and the located set of components, wherein each respective transformed data content fulfils the requested common part and the requested customized part of each respective request, and wherein each respective transformed data content is customized for being consumed in the respective communication device.

2. The method according to claim 1, further comprising advertising to the second ICN network node the number of transformed data contents.

3. The method according to claim 1, wherein each request further comprises an instruction to generate the transformed data contents according to the customized part of each of the respective collected request.

4. The method according to claim 3, wherein the instruction to generate the transformed data contents according to the customized part of each of the respective collected request is based on an enclosed data content according to the common part.

5. The method according to claim 1, further comprising:
   receiving from the second ICN network node, feedback originating from a particular communication device out of the number of communication devices, wherein the feedback relates to the transformed data content consumed in the particular communication device.

6. The method according to claim 5, further comprising:
   adjusting a data content transformation algorithm according to the feedback.

7. The method according to claim 1, further comprising:
   sending to the second ICN network node, a dynamic feedback request requesting feedback from a particular communication device out of the number of communication devices, wherein the dynamic feedback request relates to the transformed data content when consumed in the particular communication device, and wherein the feedback received from the second ICN network node relates to the dynamic feedback request.

8. The method according to claim 1, wherein the theme of the data content comprises any one or more out of:
   a name of the data content, a title of the data content,
a free text description of the data content,
an identifier of the data content,
a subset of identifiers of the data content comprised in a compiled data content, and
a subset of identifiers of the data content related to a specific theme.

9. A method performed by a second Information Centric Networking (ICN) network node for providing data content to a number of communication devices, wherein the second ICN network node operates in an ICN network, the method comprising:
collecting a number of requests, each request requesting a data content from each respective communication device out of the number of communication devices, wherein each request comprises a common part associated with a theme of the data content, and wherein each request further comprises a respective customized part associated with the data content, wherein the customized part is different in at least some of the number of requests, and wherein the customized part is requesting the data content to be customized for being consumed in the respective communication device;
sending, in a message to a first ICN network node operating in the ICN network, information about the common part and the customized part of each of the respective collected request;
receiving an advertising of a number of transformed data contents generated by the first ICN network node, wherein each respective transformed data content fulfils the requested common part and the requested customized part of each respective request, and wherein each respective transformed data content is customized for being consumed in the respective communication device; and
providing the transformed data contents to the respective communication device according to the respective request.

10. The method according to claim 9, wherein the message sent to the first ICN network node further comprises an instruction to generate transformed media files according to the customized part of each of the respective collected request.

11. The method according to claim 10, wherein the instruction to generate transformed data contents further states that it shall be based on an enclosed data content according to the common part.

12. The method according to claim 9, further comprising:
sending to the first ICN network node, feedback originating from a particular communication device out of the number of communication devices, wherein the feedback relates to the transformed data content consumed in the particular communication device.

13. The method according to claim 9, further comprising:
receiving from the first ICN network node, a dynamic feedback request requesting feedback from a particular communication device out of the number of communication devices, wherein the dynamic feedback request relates to the transformed data content when consumed in the particular communication device, and wherein the feedback sent to the first ICN network node relates to the dynamic feedback request.

14. The method according to claim 9, wherein the theme of the data content comprises any one or more out of:
a name of the data content,
a title of the data content,
a free text description of the data content,
an identifier of the data content,
a subset of identifiers of the data content comprised in a compiled data content, and
a subset of identifiers of data content related to a specific theme.

15. A first Information Centric Networking (ICN) network node configured for generating a number of data contents to a number of respective communication devices, wherein the first ICN network node is operable in an ICN network, the first ICN network node comprising:
processing circuitry configured to:
aggregate a number of requests received from a second ICN network node, wherein the number of requests are to be aggregated based on each request, according to a common part of the request, being associated with the same theme of the data content being requested by each respective communication device out of the number of communication devices,
and wherein each aggregated request further comprises a respective customized part associated with the data content, wherein the customized part is different in at least some of the number of requests, and wherein the customized part is requesting the data content to be customized for being consumed in the respective communication device;
locate a set of components corresponding to the requested data content according to the common part; and
generate a number of transformed data contents based on the aggregated number of requests and the located set of components, wherein each respective transformed data content fulfils the requested common part and the requested customized part of each respective request, and wherein each respective transformed data content is customized for being consumed in the respective communication device.

16. The first ICN network node according to claim 15, wherein the processing circuitry is configured to advertise to the second ICN network node the number of transformed data contents.

17. The first ICN network node according to claim 15, wherein each request further comprises an instruction to generate the transformed data contents according to the customized part of each of the respective collected request.

18. A second Information Centric Networking (ICN) network node configured for providing data content to a number of communication devices, wherein the second ICN network node is operable in an ICN network, the second ICN network node comprising:
processing circuitry configured to:
collect a number of requests, each request requesting a data content from each respective communication device out of the number of communication devices, wherein each request comprises a common part associated with a theme of the data content, and wherein each request further comprises a respective customized part associated with the data content, wherein the customized part is to be different in at least some of the number of requests, and wherein the customized part is to request the data content to be customized for being consumed in the respective communication device;
send, in a message to a first ICN network node operating in the ICN network, information about the common part and the customized part of each of the respective collected request;

receive an advertising of a number of transformed data contents generated by the first ICN network node, wherein each respective transformed data content fulfils the requested common part and the requested customized part of each respective request, and wherein each respective transformed data content is customized for being consumed in the respective communication device; and provide the transformed data contents to the respective communication device according to the respective request.

19. The second ICN network node according to claim 18, wherein the message sent to the first ICN network node further comprises an instruction to generate transformed media files according to the customized part of each of the respective collected request.

20. The second ICN network node according to claim 19, wherein the instruction to generate transformed data contents further states that it shall be based on an enclosed data content according to the common part.

* * * * *